United States Patent [19]

Favstritsky et al.

[11] Patent Number: 5,328,983

[45] Date of Patent: Jul. 12, 1994

[54] PROCESS FOR PURIFYING BROMINATED POLYSTYRENE

[75] Inventors: Nicolai A. Favstritsky, Lafayette; William R. Fielding; John L. Sands, both of West Lafayette, all of Ind.; Robert J. Stahl, Holland, Mich.

[73] Assignee: Great Lakes Chemical Corporation, W. Lafayette, Ind.

[21] Appl. No.: 844,478

[22] Filed: Mar. 2, 1992

Related U.S. Application Data

[63] Continuation of Ser. No. 494,302, Mar. 16, 1990, abandoned.

[51] Int. Cl.$^5$ ............................................. C08F 6/14
[52] U.S. Cl. ................................... 528/490; 528/492; 528/495; 528/499
[58] Field of Search ............... 528/499, 490, 492, 495

[56] References Cited

U.S. PATENT DOCUMENTS 4,503,219  3/1985  Reffert et al. ...................... 528/492

FOREIGN PATENT DOCUMENTS 964981  7/1964  United Kingdom ................ 528/492

*Primary Examiner*—Joseph L. Schofer
*Assistant Examiner*—Tom Weber
*Attorney, Agent, or Firm*—Woodard, Emhardt, Naughton, Moriarty & McNett

[57] ABSTRACT

The invention relates to a process for the purification of brominated styrenic homo-polymers and co-polymers. The purification process reduces or removes contained aliphatic bromine, and free bromine resulting from the reaction of the brominated reagent with the polystyrene backbone. In addition, the method optionally removes occluded inorganic halide impurities from the polymer. These impurities are considered undesirable due to their adverse effects on thermal aging and stability of the final end use resin formulations.

19 Claims, No Drawings

PROCESS FOR PURIFYING BROMINATED POLYSTYRENE

This application is a continuation of application Ser. No. 07/494,302, filed Mar. 16, 1990, (now abandoned).

FIELD OF INVENTION

The present invention relates to a process for the purification of brominated styrenic homo- and co-polymers.

BACKGROUND OF THE INVENTION

The potential use of brominated polystyrene to flame retard plastic components for use in household appliances, chemical or foodstuff containers, machine components and the like has become well-known. Brominated polystyrenes are typically obtained through the Lewis acid catalyzed aromatic bromination of polystyrene. The styrenic polymers to be brominated are produced by any of the common polymerization techniques. These methods commonly employ ionic or free radical initiated polymerization of styrenic monomers with or without a solvent. Bromination of the polystyrene is typically achieved using a metal halide catalyst such as antimony trichloride and bromine or bromine chloride as the bromination reagent. An organic halocarbon solvent such as dichloroethane is also used in the bromination reaction.

Alternatively, brominated polystyrene may be produced using bromine as the reaction solvent, bromine chloride as the bromination reagent and an anhydrous metal halide catalyst. This process, which is the subject of co-pending U.S. patent application Ser. No. 007,778, now abandoned, permits controlled bromination of the polystyrene. At the same time, however, it affords a product with higher levels of occluded free bromine and ionics as well as higher levels of contained aliphatic halogen. The aliphatic bromine impurities have been found to result in a brominated polymer of lower thermal stability when subjected to formulation conditions resulting in discoloration of the formulation and corrosivity to the processing equipment. Ionics may degrade formulations in respect to their ultimate electrical properties. They may also result in corrosion of processing equipment or in the corrosion of metallic parts in their end-use applications.

Previously known processes for purifying the brominated polystyrene have proven to be both costly and ineffective. In Diebel et al., U.S. Pat. No. 4,200,703, a purification procedure is disclosed for ionic halogen removal from a brominated polystyrene. In accordance with the procedure disclosed there, the ionic halogen or salts are removed through multiple aqueous washes of a brominated polystyrene/chlorocarbon solution. The polymer is then isolated by precipitation into a polymer non-solvent and filtered. The Diebel process dissolves the polymer then recovers it by precipitation. Although such reprecipitation procedures are effective in removing occluded impurities, they are ineffective in removing hydrolyzable aliphatic halogen.

Accordingly, it is the primary object of the present invention to provide a method for removing or reducing undesirable aliphatic organic bromine impurities from brominated polystyrene.

Another object is to provide a method for removing occluded inorganic halide impurities from the polymer.

Yet another object is to provide a method for improving the thermal stability and reducing the corrosive nature of brominated polystyrenes.

A still further object of the present invention is to purify the brominated styrenic homo- or co-polymers such as brominated polystyrene without the need for first dissolving the polymer.

SUMMARY OF THE INVENTION

The foregoing and other objects, advantages and features of the present invention may be achieved with a process for the purification of aromatic brominated polystyrene in which the brominated polystyrene is treated in, alternatively, an aqueous slurry or a aqueous non-solvent slurry, consisting of an alcohol having from one to five carbons and water.

The novel process removes aliphatic bromine and occluded elemental bromine from the brominated polystyrene by reaction with an appropriate chemical reagent, such as ammonia or hydrazine, which serves as both a nucleophile and a bromine-reducing agent. In the most preferred embodiment of the process, the crude solid brominated polystyrene is treated as an aqueous non-solvent slurry. Alternatively, it may be treated as an aqueous slurry. The process is preferably conducted in a stirred pressure vessel at a temperature ranging from 100°–160° C. The product is isolated by filtration, then dried in a forced draft oven to yield an off-white powder.

When water alone is used as the digestion non-solvent, a product is obtained which has reduced levels of aliphatic halogen and free bromine but still contains significant amounts of ionic halogen. However, when a non-solvent mixture such as an alcohol containing from one to five carbons and water are used for the digestion solvent, occluded ionic halogen is also removed from the product.

Brominated styrenic homo- and co-polymers such as brominated polystyrene having virtually any degree of aromatic bromination can be purified in accordance with the novel processes of the present invention. More specifically, this process is effective in treating brominated polystyrene having an organic bromine content ranging from about 0 to about 76 percent. That range corresponds to a product containing up to four bromines per contained aromatic unit on the polymer. It is most preferred to treat brominated polystyrenes which contain from about 44 to about 76 percent organic bromine, which corresponds to the range of 1 to 4 bromines per aromatic unit. This range of 1 to 4 bromines per aromatic unit represents the most useful range of organic bromine content for use in thermoplastic resins. In addition, this purification process is suitable for use with crude products which contain aliphatic organic halogen on the polymer backbone in amounts ranging from greater than 0 up to about 2 percent, but most commonly less than about 1 percent. This aliphatic halogen, when present, makes a major contribution to thermal instability.

The process disclosed and claimed herein can be used with brominated polystyrenes which have Mp peak average molecular weights ranging from about 1000 to about 1.5 million. To determine the Mp value, the sample is analyzed by gel permeation chromatography. The peak molecular weight is calculated by comparing the retention time of the main peak with the curve generated using monodisperse polystyrene and styrene calibration standards. The most useful and thus preferred range has been found to be from about 8,000 to about 120,000 peak molecular weight units. The upper practical range is about 300,000 peak molecular weight units, based upon bromination of the commercially available polystyrenes.

Brominated polystyrenes purified in accordance with this invention are thermally stable as compared to crude product and are useful as flame retardant additives in various thermoplastic resins.

Although the purification procedure of applicant's invention was developed for brominated polystyrene, it can also be used for the purification of other styrenic copolymers and homo-polymers. For example, brominated styrene/maleic anhydride co-polymer, brominated styrene/acrylonitrile co-polymer, brominated poly($\alpha$-methylstyrene) and brominated poly(p-methylstyrene), as well as a wide variety of additional brominated styrenic homo-polymers and co-polymers can be purified using this digestion procedure.

DESCRIPTION OF THE PREFERRED EMBODIMENTS

In accordance with this invention, two related processes have been developed for the purification of brominated polystyrene. The first process requires treatment of the brominated polymer as an aqueous slurry. The product of the first process can be further purified by dissolving the brominated polystyrene in a chlorocarbon solvent such as 1,2-dichloroethane, and washing the resulting brominated polymer solution to remove the previously occluded impurities. After a second precipitation, an essentially salt-free polymer is obtained. The second process uses a non-solvent system for the digestion slurry, consisting of an alcohol having from one to five carbons and water. When the alcohol is used as the digestion solvent, a swelling and thus softening of the polymer occurs. This increases the mobility of occluded impurities in the brominated polymer. Thus, the removal of occluded impurities is achieved without the need to dissolve the polymer in a chlorocarbon solvent, wash the solution to remove impurities, precipitate the polymer in a non-solvent, and isolate the polymer by filtration.

There are a number of features common to both the aqueous and the aqueous non-solvent digestion processes. First, both processes treat the brominated polystyrene as a solid. The solid is slurried in the non-solvent or mixed non-solvent at concentrations ranging from about 1 to about 40 percent by weight. Second, both processes use an appropriate bromine reducing agent which also can act as a nucleophile such as ammonia, hydrazine, methyl amine, dimethyl amine or lower molecular weight amines to simultaneously reduce the occluded bromine and react with the contained aliphatic halogen. Excess levels of ammonia, ranging from about 1 to about 6 percent typically, by weight of the polymer, are used in both processes. Third, both processes are run at temperatures ranging from about 100° C. to about 160° C. and, as a consequence, are run at pressures greater than atmospheric.

The principal difference between the two processes is in the degree of purification of the final brominated polystyrene. Although both processes are equivalent in terms of elemental bromine removal and similar in aliphatic halogen reduction, the aqueous digestion process does not effectively remove occluded impurities such as salt. Removal of these impurities requires additional purification steps beyond the digestion process steps. In contrast, the aqueous non-solvent digestion process affords a product with greater reduction of occluded impurity content (and, in particular, ionic salts), than the aqueous digestion process. In the aqueous non-solvent digestion process, the alcohol softens the polymer, resulting in greater mobility of the occluded impurities, thereby effecting their removal.

Aqueous Digestion Process

The aqueous digestion process for the purification of brominated polystyrene affords a product with a lower aliphatic halogen content on the polymeric backbone. Under the digestion conditions, the aliphatic halogen reacts with a reducing agent, preferably ammonia, and is simultaneously converted to ionic bromide which remains occluded within the polymer. The brominated polystyrene is treated with ammonia as an aqueous solid slurry in a stainless steel pressure reactor at temperatures greater than approximately 100° C. which results in reaction pressures greater than atmospheric. The amount of hydrolyzable halogen eliminated is proportional to time and temperature; longer times and higher temperatures affording the greatest effect.

Temperatures ranging from slightly greater than 100° C. up to 160° C. have been found to be useful for the removal of the aliphatic bromine contained on the polymeric backbone. The greatest removal occurs when the higher temperatures in this range are used. Although temperatures greater than 160° C. may be useful for some brominated polymers with high melt ranges, when the preferred brominated polymer is used, temperatures greater than or equal to 160° C. cause excessive softening of the polymer. This results in the solid particles agglomerating, destroying the slurry, and preventing ready recovery of the product. Although the optimum purification temperature is dependent upon the crude polymer softening temperature, the most preferred temperature range lies between about 125° to about 150° C.

Times ranging from about 1 to about 32 hours have been evaluated for the aqueous digestion process. Longer times afford the greatest decrease in hydrolyzable halogen, however, the extent of hydrolyzable removal is not entirely linear with time. Digestion times less than about eight hours do not provide maximum decrease and times greater than about 16 hours do not result in significant further lessening of the hydrolyzable halogen. Therefore, digestion times ranging from about 8 to about 16 hours are most preferred for this process.

Two parameters of minor importance for decreasing aliphatic halogen are slurry concentration and the excess quantity of nucleophile/reducing agent required. The preferred process involves treatment of brominated polystyrene as a solid, preferably a solid/water slurry. Slurry concentrations ranging from about 1 to about 40 weight percent solids have been evaluated. Slurry concentrations greater than about 40 weight percent are very thick and difficult to handle: whereas very low slurry concentrations are easily handled but lack practicality due to low reactor productivity. Therefore, the preferred slurry concentration falls between about 1 to about 40 weight percent solid with slurry concentrations between about 10 to about 30 weight percent solid providing the most desirable balance of ease in handling and productivity. The crude product can be isolated and slurried in water or the aqueous slurry resulting from the crude brominated polystyrene can be used directly.

Bromine-reducing agents which can function as nucleophiles, such as ammonia, hydrazine, methyl amine, dimethyl amine, lower molecular weight amines, bisulfite, thiosulfate, and formate are most desirable for this aqueous digestion process. Such reducing agents are not only effective at lowering the quantity of aliphatic halogen by nucleophilic reaction but they simultaneously eliminate elemental bromine from the polymer. The most preferred reducing agents are hydrazine and ammonia. When ammonia or hydrazine are added to the solid slurry and the temperature increased under pressure, the ammonia, and hydrazine react with the aliphatic halogen contained on the polymer backbone. Ammonia and hydrazine have the apparent ability to penetrate the polymer particles. The aliphatic halogen which is present at levels ranging from about 3,000 to about 6,000 ppm reacts with the ammonia or hydrazine and is converted to a proportionate quantity of ionic halide (ammonium bromide) which becomes occluded within the polymer. These occluded salts are not mobile and thus remain in the brominated polystyrene.

In addition to reaction with the aliphatic halogen, the ammonia and hydrazine reduce the occluded elemental bromine which is present at levels averaging approximately 500 ppm. The elemental bromine is also converted to a proportionate quantity of ionic halogen which also remains occluded within the polymer. Thus, the major portion of the occluded ionic halogen remaining in the polymer results from the aliphatic halogen content.

An excess of the reducing agent is required to ensure complete reaction with contained elemental bromine and aliphatic bromine. The optimum concentration of reducing agent is obviously dependent on the actual levels of the impurities in the specific polymer being purified. Typical levels of ammonia range from about 1 to about 12 percent by weight based upon the contained solids. Higher concentrations of ammonia falling within the range of about 3 to about 12 percent are most effective at hydrolyzable reduction with only a modest improvement at levels greater than about 3 percent. The preferred reducing agent for the digestion is ammonia which can be added as an anhydrous gas or as aqueous ammonium hydroxide.

A typical crude brominated polystyrene prior to pressure digestion in water with ammonia has an aliphatic halogen content of about 3,000 to about 6,000 ppm and about 200 to about 1,000 ppm occluded elemental bromine. After purification by aqueous digestion, the aliphatic halogen content is decreased to about 500 to about 1,000 ppm and the occluded elemental bromine is reduced to non-detectable levels. Correspondingly, the ionic bromide occluded in the polymer increases to about 5,000 to 10,000 ppm up from the 2,000 to 8,000 ppm in the crude product.

Upon completion of the aqueous digestion process, the brominated polystyrene is isolated from the aqueous mother liquor by filtration. The wet-cake is then washed with water and dried in a forced draft oven at a temperature ranging from about 140° to about 150° C. Alternately, the brominated polystyrene can be further purified by removal of the contained ionic halogen, by dissolving the brominated polymer in a solvent such as dichloroethane. The aqueous slurry resulting from the aqueous digestion process is simply added with vigorous stirring to hot dichloroethane resulting in an organic brominated polymer solution with an aqueous phase. The brominated polystyrene is then isolated from the solution by adding the polymer solution to a non-solvent, such as an alcohol. The polymer solution is added to the alcohol at ambient temperature and the precipitated product is isolated by filtration and dried. Water may, alternatively, be used as the non-solvent. In this case the organic brominated polymer solution is added to refluxing water. The polymer solvent azeotropically distills with water as the polymer simultaneously precipitates and is subsequently isolated as an aqueous slurry. The product is then filtered and dried in an oven. This solvent purification process decreases the ionic halogen content from approximately 7,000 ppm to less than about 500 ppm.

Aqueous Non-solvent Digestion Process

The aqueous non-solvent digestion process for purification of brominated polystyrene affords a product with not only decreased aliphatic halogen content, but also with a decreased ionic halogen content. In a similar fashion to the aqueous digestion process, the aliphatic halogen contained on the polymeric backbone in the aqueous non-solvent digestion process reacts with the preferred bromine reducing agent, ammonia, converting it to occluded ionic halogen. In addition, elemental bromine occluded in the polymer is also reduced by ammonia and converted to a proportionate amount of ionic bromide. However, the non-solvent digestion process has the added advantage over the aqueous digestion process of softening and swelling the polymer in such a fashion that the occluded ionics have increased mobility in the polymer, are dissolved in the solvent phase, and so are removed.

The crude brominated polystyrene is treated as a solid slurry in a digestion reactor such as a stirred stainless steel autoclave at temperatures greater than about 100° C. which results in pressures greater than atmospheric. The extent of hydrolyzable reduction and ionic halogen removal is dependent upon several digestion parameters discussed below. A number of low molecular weight alcohols having from 1 to about 5 carbon atoms are suitable for use as one component of the digestion solvent in this purification process. The brominated polystyrene has the lowest solubility in alcohols falling within this molecular weight range whereas, the contained ionics of the polystyrene have the highest solubility in these alcohols. In addition, ionic solubility is greatest for the lower molecular weight alcohols, especially those having 1 or 2 carbon atoms. Alcohols which have been evaluated in the aqueous digestion process include: methanol, n-propanol, isopropanol, n-butanol, and n-pentanol. The relative proportions of alcohol to water chosen varies depending upon the type of alcohol used in the system. Larger ratios of the higher molecular weight alcohols cause the product to become sticky and form a product crust in the digestion reactor, thereby reducing the effectiveness of the purification. Large ratios of low molecular weight alcohols cause undesirably high pressures in the digestion. The preferred alcohols for the process include isopropanol, n-butanol, and n-propanol because of their significant solubility in water and the lower pressures which result at the reaction temperatures thereby making these alcohols more favorable in industrial scale work. In addition, the preferred alcohols are readily purified for recycle and easily removed from the product during drying.

Temperatures ranging from about 100° to about 150° C. have been evaluated for the alcohol digestion process. The extent of hydrolyzable halogen elimination is proportional to the temperature used. Higher digestion temperatures produce the greatest elimination of aliphatic bromine levels and are more effective at ionic halogen removal. This elimination is due in part to increased softening and swelling within the polymer caused by a combination of both temperature and alcohol which results in increased mobility of the ionics. As temperatures are increased above about 140° C., the alcohol temperature combination tends to increase softening of the polymer. The particles become sticky, resulting in a coagulation with a loss of product suspension in the slurry; the effectiveness of the purification is impaired by larger particles. Although less effective, temperatures below about 110° C., still afford some degree of purification in terms of hydrolyzable halogen elimination, but are generally much less effective for ionic halide removal. This is most likely due to insufficient mobility of the ionics occluded within the polymer at this temperature. Therefore, the preferred temperature range lies between about 125° to about 140° C. for the digestion process, but ultimately, the optimum purification temperature is dependent upon the crude polymer softening temperature, which in turn is influenced by polymer molecular weight, degree of cross-linking, and monomer composition used in polymerization.

We have evaluated digestion times ranging from about 1 to about 36 hours for the aqueous non-solvent digestion process. Digestion time is a parameter which affects the extent of elimination of aliphatic halogen and the removal of occluded ionic halogen. Longer digestion times equal to or greater than about 12 hours have been found to be more desirable in terms of both hydrolyzable and ionic halogen removal. Ionic halogen removal requires digestion times of about 16 hours for maximal elimination. Digestion times less than about 8 hours are only moderately effective in hydrolyzable halogen elimination. In addition, further hydrolyzable halogen removal appears to be minimal at times greater than about 16 hours, where an apparent leveling off effect occurs. The preferred digestion time is thus about 12 to about 16 hours maximum, since there is no apparent benefit to using longer or shorter times. The preferred digestion time is dependent on the crude polymer characteristics, as detailed above in the preceding paragraph.

For ionic halogen removal, we have found that short purification digestion times of less than about 8 hours are only moderately effective. For example, using 1 hour as a digestion time produces only a minor removal of ionic halogen. Digestion times in the range of about 12 to about 16 hours have been found to be most ideal with the maximum effect occurring at about 16 hours. Thus, the preferred digestion time for maximal ionic halogen removal lies between about 12 to about 16 hours. Overall, in terms of removing both hydrolyzable halogen and ionic halogen the most preferred time is about 16 hours.

Slurry concentrations generally have a significant effect upon hydrolyzable halogen removal, based upon evaluation of slurry concentrations ranging from about 1 to about 40 percent by weight of solids. For maximum productivity, higher slurry concentrations such as about 30 or 40 percent by weight of solids are desirable. Slurries having solids concentrations greater than about 40 percent are extremely viscous and difficult to handle, and therefore are less desirable for production processes.

Slurry concentration produces a significant effect upon removal of ionic halogen occluded within the polymer. It has been found that slurries having solids concentrations less than about 20 percent are more effective at ionic halogen removal. Although effective at ionic halogen removal, however, solids concentrations less than about 10 percent lack desirability from the standpoint of production productivity. Overall, solid concentrations of approximately 14 percent offer a good balance between removal of ionic halogen while maintaining a reasonable productivity and, therefore, solid concentrations of about 14 percent are most desirable.

An aqueous non-solvent digestion process not only minimizes hydrolyzable halogen but has the added advantage of removing the occluded ionic halogen.

The aqueous non-solvent digestion process has been evaluated using alcohol-to-water ratios ranging from 95 percent alcohol/5 percent water, to about 5 percent alcohol/95 percent water by weight. Although the relative proportion of alcohol used has a minor effect in regards to hydrolyzable halogen removal, the relative ratio of alcohol to water does have an effect on ionic halogen removal. The optimal alcohol-to-water ratio lies between about 30 percent to about 70 percent alcohol, with maximal ionic elimination occurring at less than about 50 percent with the most preferred being about 30 percent alcohol by weight.

The digestion purification process has been evaluated using ammonia concentrations ranging from about 1 to about 12 percent by weight. It has been found that about 3 to 6 percent ammonia by weight, based upon contained solids, is sufficient to produce the desired results and, therefore, is the preferred level.

A typical crude product containing aliphatic halogen of about 3,000 to about 6,000 ppm and ionic halogen content of about 2,000 to about 8,000 ppm when digested under the optimal conditions will contain a hydrolyzable halogen content of less than about 1,000 ppm and ionic halogen content of less than about 1,000 ppm. The optimal digestion conditions are approximately a temperature of about 140° C., a time of about 16 hours, and an alcohol-to-water ratio of 30/70 and 3 percent ammonia by weight of solids for isopropanol.

Upon completion of the aqueous non-solvent digestion process, the product is isolated from the aqueous non-solvent slurry by filtration. The off-white solids are dried in a forced draft oven in the range of about 140 to about 150° C. Alternately, the solids isolated by the filtration can be dissolved in an organic chlorocarbon solvent and reprecipitated into a non-solvent if further purification is desired.

The following examples are presented as illustrative only of the process of the invention and in no way are intended to limit the invention to the specific features of the process described:

EXAMPLE I

Purification of Crude Brominated Polystyrene (Mp 100,000) via the Aqueous Ammonium Hydroxide Procedure To a two-liter stirred stainless steel pressure reactor was charged 300 g. of crude brominated polystyrene wet cake having an LOD (loss on drying) of 30.2%, (209.4 g. as dry product), 400.5 g. of water and 21.2 g.

of aqueous ammonium hydroxide (29% as NH₃). The reactor was capped and the temperature gradually increased to 140° C. (72 psig) where it was held for 12 hours under constant agitation. At the end of the holding period, the reactor and contents were gradually cooled to less than 100° C. and a pressure of essentially 0 psig. The slurry was removed from the reactor and the solids separated via suction filtration. The wet cake was washed with 363.2 g. of water followed by an additional 500 g. of water. This yielded 288.1 g. of water wet cake having an LOD of 27.2%. The wet product (282.9 g.) was dried in a forced draft oven at 140° C. and yield 206.0 g. of final product. This is a yield of 98.4%.

| Analysis Hydrolyzable Halogen as Bromide, ppm | |
|---|---|
| Crude | Purified |
| 3300 | 1800 |

EXAMPLE II

Purification of Crude Brominated Polystyrene (Mp 10,000–15,000) via the Aqueous Ammonium Hydroxide Digestion Process: Effect of Slurry Concentration In a similar fashion to Example I, low molecular weight brominated polystyrene having an Mp molecular weight of 10,000–15,000 was purified via the aqueous ammonium hydroxide pressure digestion. However, the slurry concentration as weight percent in solids was varied to study its effect on purification. The digestion conditions were 140° C., 12 hours digestion time using 3 weight percent ammonia, based upon the solids content. These results are listed in Table I.

TABLE I

| Effect of Varying Slurry Concentration | | | |
|---|---|---|---|
| Slurry Concentration, Wt. % Solids | Hydrolyzable Halogen as Bromide, ppm | | |
| | Purified Product | Crude Product | Comments |
| 1% | 3500 | 4000 | |
| 17.5 | 1600 | 4500 | 8 hr. run time |
| 30 | 2300 | 4000 | |
| 40 | 2000 | 4000 | |

EXAMPLE III

Purification of Crude Brominated Polystyrene (Mp 10,000–15,000) via the Aqueous Ammonium Hydroxide Digestion Process: Effect of Digestion Time In a similar fashion to Example I, low molecular weight brominated polystyrene was purified by pressure digestion as a solid/slurry in aqueous ammonium hydroxide. However, the reaction time was varied from one to 32 hours. The digestion conditions used were 140° C., 30 weight percent solid aqueous slurry and 3 weight percent ammonia based upon the solids content.

TABLE II

| Effect of Digestion Time on Hydrolyzable Bromine | | |
|---|---|---|
| Digestion Time, Hours | Hydrolyzable Halogen as Bromide, ppm | |
| | Purified Product | Crude Product |
| 1 | 3600 | 4000 |
| 2 | 1600 | 4000 |
| 12 | 2300 | 4000 |
| 16 | 1400 | 4000 |
| 32 | 1500 | 4000 |

EXAMPLE IV

Purification of Brominated Polystyrene (Mp 10,000–15,000) via the Aqueous Ammonium Hydroxide Digestion Process: Effect of Digestion Temperature In a fashion similar to Example I, the effect of temperature on the purification of brominated polystyrene was evaluated via the aqueous ammonium hydroxide digestion procedure. Temperatures ranging from 100° C. to 160° C. were evaluated.

TABLE III

| Effect of Temperature on Hydrolyzable Bromine | | |
|---|---|---|
| Digestion Temperature, °C. | Hydrolyzable Halogen as Bromide, ppm | |
| | Purified Product | Crude Product |
| 100 | 4300 | 4000 |
| 110 | 4700 | 4500 |
| 125 | 2400 | 4000 |
| 140 | 2300 | 4000 |
| 150 | 1000 | 4500 |
| 160 | 700 | 4000 |

EXAMPLE V

Purification of Crude Brominated Polystyrene (Mp 10,000–15,000) via the Aqueous Ammonium Hydroxide Digestion: Effect of Ammonia Concentration Low molecular weight brominated polystyrene was purified in a fashion similar to Example I using the aqueous digestion procedure. The temperature for the digestion was 140° C. The time was maintained at 12 hours and the slurry concentration at 30 percent by weight of contained solids. However, for ammonia, the concentration was varied from 2 to 12 percent by weight of solids.

TABLE IV

| The Effect of Ammonia Concentration on Hydrolyzable Halogen | | |
|---|---|---|
| Ammonia Wt. % on Solids | Hydrolyzable Halogen as Bromide, ppm | |
| | Purified Product | Crude Product |
| 2 | 2700 | 4000 |
| 3 | 2300 | 4000 |
| 6 | 1000 | 4000 |
| 12 | 1700 | 4000 |

EXAMPLE VI

Purification of Crude Brominated Polystyrene (Mp 10,000–15,000) via the Aqueous Digestion Procedure: Effect of Chemical Reagent for Treatment In a fashion similar to Example I, except that the chemical treatment reagent was varied, a low molecular weight brominated polystyrene was purified using the aqueous digestion process described in Example II. The temperature for the digestion was 140° C.; the time was maintained at 12 hours and the slurry concentration at 30% by weight upon contained solids. The reducing agent used to effect the purification was varied, but maintained at 3% by weight based upon solids.

TABLE V
The Effect of Reducing Agent Type on Hydrolyzable Bromine

| Reagent Used | Hydrolyzable Halogen as Bromide, ppm | |
|---|---|---|
| | Crude | Purified |
| Sodium bisulfite | 4000 | 4100 |
| Sodium formate | 4000 | 3900 |
| Hydrazine | 4000 | 2300 |

EXAMPLE VII

Purification of Brominated Polystyrenes via the Aqueous Ammonium Hydroxide Digestion Procedure: Effect of Polymer Molecular Weight In a fashion similar to Example I, a number of brominated polystyrene homopolymers of varying molecular weights were evaluated via the purification procedure. The results are listed in Table VI along with the variation of conditions from that of Example I. The digestion time was 12 hours.

TABLE VI
Purification of Brominated Polystyrene of Varying Molecular Weight

| Polystyrene Mp Molecular Weight | Temperature °C. | Slurry Concentration Wt. % Solids | Hydrolyzable Halogen as Bromide, ppm | |
|---|---|---|---|---|
| | | | Purified Product | Crude Product |
| 500 | 125 | 20 | 3400 | 14600 |
| 2,000–3,000 | 140 | 30 | 1100 | 6900 |
| 10,000–15,000 | 140 | 30 | 900 | 4500 |
| 100,000–125,000 | 150 | 30 | 800 | 1500 |

EXAMPLE VIII

Purification of Crude Brominated Polystyrene (Mp 10,000–15,000) Using 30% Isopropanol and Aqueous Ammonium Hydroxide The following were charged into a stirred two-liter stainless steel pressure reactor: 320.0 g. of crude brominated polystyrene wetcake having an LOD of 29.8% (223.4 g. as dry product), 383.0 g. of isopropanol, 782.0 g. of water, and 22.7 g. of aqueous ammonium hydroxide (29.8% as $NH_3$). The reactor was closed and the temperature gradually increased to 140° C. (72 psig) where it was held for 16 hours being constantly agitated. At the conclusion of the holding period, the reactor and contents were gradually cooled to ambient temperature and a pressure of 0 psi. The slurry was removed from the reactor and the solids separated by suction filtration. The resulting wet cake was washed with water which afforded 399.8 g. of wet cake. After drying at 140° C. in a forced draft oven, 226.8 g. of purified brominated polystyrene was recovered. This recovery represents approximately a 100%/yield.

| | Hydrolyzable Halogen as Bromide, ppm | Ionic Halogen as Bromide, ppm |
|---|---|---|
| Crude product | 3800 | 3900 |
| Purified product | 500 | 1000 |

EXAMPLE IX

Purification of Brominated Polystyrene (Mp 10,000–15,000) via Digestion in Isoproponal and Water: Effect of Slurry Concentration In a fashion similar to Example VIII brominated polystyrene was purified via digestion in an isopropanol water mixture consisting of 30% isopropanol to 70% water by weight. Conditions that vary from those described in Example VIII as well as results are listed in Table VII. The amount of ammonia used was 3 weight percent based upon solids content of the slurry.

TABLE VII
The Effect of Slurry Concentration on the Water/Isopropanol Purification

| Comparison Number | Slurry Concentration Wt. % Solids | Temp °C. | Time Hours | Purified Product | | Crude Product | |
|---|---|---|---|---|---|---|---|
| | | | | Hydrolyzable Halogen As Bromide, ppm | Ionic Halogen As Bromide, ppm | Hydrolyzable Halogen As Bromide, ppm | Ionic Halogen As Bromide, ppm |
| 1 | 1 | 125 | 12 | 3100 | 2200 | 4000 | 8900 |
| | 40 | 125 | 12 | 1400 | 2400 | | |
| 2 | 14 | 110 | 8 | 2300 | 3300 | 4500 | 7900 |
| | 40 | 110 | 8 | 400 | 5400 | | |
| 3 | 14 | 110 | 36 | 1700 | 2800 | | |
| | 40 | 110 | 36 | 1700 | 4800 | 4000 | 8900 |
| 4 | 14 | 140 | 12 | 1300 | 600 | | |
| | 14 | 140 | 12 | 800 | 1300 | | |
| | 30 | 140 | 12 | 200 | 4600 | | |
| 5 | 17.5 | 140 | 12 | 800 2700 (70% IPA) | | 4500 | 7900 |
| | 30 | 140 | 12 | 400 5400 (70% IPA) | | | |

EXAMPLE X

Purification of Brominated Polystyrene (Mp 10,000–15,000) Using Isopropanol and Water Digestion System: Effect of Digestion Time In a similar fashion to Example VIII, brominated polystyrene was purified via the isopropanol water digestion procedure. However, the treatment time was varied from 1 to 32 hours to study its effect on the purification. The results of this work are listed in Table VIII. The digestion temperature was 140° C., using a isopropanol-70% water mixture.

TABLE VIII

| | | Effect of Treatment Time on the Isopropanol Water Digestion | | | |
|---|---|---|---|---|---|
| Time Hours | Slurry Concentration Wt. % Solids | Hydrolyzable Halogen As Bromide, ppm | Ionic Halogen As Bromide, ppm | Hydrolyzable Halogen As Bromide, ppm | Ionic Halogen As Bromide, ppm |
| 1 | 15 | 2000 | 2000 | 4000 | 8900 |
| 8 | 14 | 1100 | 1200 | 4500 | 7900 |
| 12 | 14 | 1300 | 900 | | |
| 16 | 15 | 1100 | 200 | 4000 | 8900 |
| 32 | 15 | 1100 | 800 | | |

EXAMPLE XI

Purification of Brominated Polystyrene (Mp 10,000–15,000) by Isopropanol Water Digestion: Effect of Digestion Temperature Low molecular weight brominated polystyrene was purified in a fashion similar to Example VIII with the exception that the temperature was varied over a range from 100 to 140° C. The solvent consisted of a mixture of 30% isopropanol and 70% water. Digestion time was 12 hours. The object of the experiment was to evaluate the effect of temperature upon hydrolyzable and ionic halogen. The results are listed in Table IX.

TABLE IX

| | | Isopropanol Water Digestion Temperature | | | |
|---|---|---|---|---|---|
| | | Purified Product | | Crude Product | |
| Temp °C. | Slurry Concent. Wt. % Solids | Hydrolyzable Halogen As Bromide, ppm | Ionic Halogen As Bromide, ppm | Hydrolyzable Halogen As Bromide, ppm | Ionic Halogen As Bromide, ppm |
| 100 | 15 | 3100 | 4600 | 4000 | 8900 |
| 110 | 14 | 3300 | 4700 | 4000 | 8900 |
| 140 | 14 | 1300 | 600 | 4000 | 8900 |
| 140 | 14 | 800 | 1300 | 4000 | 8900 |

EXAMPLE XII

Purification of Brominated Polystyrene (Mp 10,000–15,000) Using Varying Ratios of Isopropanol to Water In a similar fashion to Example VIII, brominated polystyrene was purified. The ratio of isopropanol to water was varied over a range of 95% alcohol to 5% alcohol in order to evaluate the effect upon hydrolyzable halogen reduction and ionic halogen removal. The digestion temperature was 140° C. for a 12-hour time period. The results are tabulated in Table X.

TABLE X

| | | Effect of Isopropanol to Water Ratio for Digestion | | | |
|---|---|---|---|---|---|
| Wt. % Ratio of IPA to Water | Slurry Concentration Wt. % Solids | Purified Product | | Crude Product | |
| | | Hydrolyzable Halogen As Bromide, ppm | Ionic Halogen As Bromide, ppm | Hydrolyzable Halogen As Bromide, ppm | Ionic Halogen As Bromide, ppm |
| 5/95 | 15 | 1600 | 5000 | 4000 | 8900 |
| 30/70 | 14 | 1300 | 600 | 4000 | 8900 |
| 70/30 | 17.5 | 800 | 2100 | 4000 | 8900 |
| 95/5 | 15 | 800 | 800 | 4000 | 8900 |

EXAMPLE XIII

Digestion of Brominated Polystyrene (Mp 10,000–15,000) Using Various Aqueous Alcohol Systems: Effect of Alcohol on Purification In a similar fashion to Example VIII, alternate alcohols have been evaluated for the digestion purification process in place of isopropanol. These alcohols are listed in Table XI as well as the variation in conditions with which they have been evaluated. The reactions were conducted at 125° C. using 3 weight percent ammonia.

TABLE XI

| | | | | Alternate Alcohols Used for Brominated Polystyrene Digestion Purification | | | |
|---|---|---|---|---|---|---|---|
| | Alcohol To Water Ratio Wt. % | Slurry Conc. Wt. % Solids | Time, Hours | Purified Product | | Crude Product | |
| Alcohol | | | | Hydrolyzable Halogen As Bromide, ppm | Ionic Halogen As Bromide, ppm | Hydrolyzable Halogen As Bromide, ppm | Ionic Halogen As Bromide, ppm |
| Methanol | 85/15 | 17.5 | 12 | 1900 | 1700 | 6400 | 3900 |
| Methanol | 70/30 | 17.5 | 12 | 1200 | 2100 | 4100 | 4600 |
| n-Propanol | 70/30 | 17.5 | 12 | 800 | 1000 | | |
| n-Propanol | 50/50 | 17.5 | 8 | 600 | 1800 | 4500 | 7900 |
| n-Butanol | 65/35 | 20 | 8 | 700 | 3500 | 4000 | 8900 |
| n-Butanol | 50/50 | 17.5 | 12 | 1000 | 600 | | |
| n-Pentanol | 70/30 | 17.5 | 12 | 800 | 1000 | 4000 | 8900 |
| Isopropanol | 70/30 | 17.5 | 12 | 500 | 3200 | 4500 | 7900 |
| Isopropanol | 30/70 | 14.0 | 16 | 500 | 1000 | 3800 | 3900 |

We claim:

1. A process for reducing the amount of impurities in styrenic homo-polymers or co-polymers that have been brominated, and having an organic bromine content of up to approximately 76 percent by weight, said polymers including as occluded impurities at least one of halogens in aliphatic positions on the polymer backbone and elemental halogen, said process comprising the steps of:
   a. combining said brominated polymers with an aqueous non-solvent to form a slurry;
   b. reacting the at least one of halogens in aliphatic positions on the polymer backbone and elemental halogen occluded impurities in said brominated polymers while in the slurry with a halogen-reducing agent for a sufficient time and at a sufficient temperature to reduce the at least one of aliphatic halogen compounds and elemental halogen occluded impurities to ionic halogen materials; and
   c. separating the ionic halogen materials from the brominated polymers.

2. A process as claimed in claim 1 wherein the aqueous non-solvent is water.

3. A process as claimed in claim 1, wherein the organic bromine content of said polymers ranges from approximately 44 to approximately 76 percent by weight.

4. A process as claimed in claim 1, wherein the sufficient temperature is in the range of approximately 100 to approximately 160 degrees centigrade.

5. A process as claimed in claim 1, wherein the sufficient time is in the range of about 1 to about 36 hours.

6. A process as claimed in claim 1, wherein the halogen-reducing agent is selected from the group consisting of ammonia, hydrazine, methyl amine, dimethyl amine, formate and lower molecular weight amines.

7. A process as claimed in claim 6, wherein the halogen-reducing agent is ammonia.

8. A process as claimed in claim 1, wherein step c. comprises isolating the polymer product by filtration and drying the polymer product.

9. A process as claimed in claim 1, wherein the aqueous non-solvent is an alcohol-water mixture.

10. A process as claimed in claim 9, wherein the alcohol is selected from the group consisting of low molecular weight alcohols having from about 1 to about 5 carbon atoms.

11. A process as claimed in claim 10, wherein the alcohol is a member selected from the group consisting of isopropanol, n-butanol, and n-propanol.

12. The process of claim 1 in which said polymers include halogens in aliphatic positions of the polymer backbone, step b. comprising reacting the occluded aliphatic halogen compounds with a halogen-reducing agent to produce ionic halogen materials, and step c. comprises removing the ionic halogen materials from said polymers.

13. The process of claim 1 in which said polymers include occluded elemental halogen, step b. comprising reacting the occluded elemental halogen with a halogen-reducing agent to produce ionic halogen, and step c. comprises removing the ionic halogen from said polymers.

14. The process of claim 1 in which said polymers include both halogens on aliphatic positions of the polymer backbone and occluded elemental halogen, step b. comprising reacting the halogens on aliphatic positions of the polymer backbone and elemental halogen with a halogen-reducing agent to convert both into ionic halogen materials, and step c. comprises removing the ionic halogen materials from said polymers.

15. The process of claim 2 in which step c. comprises isolating the polymer product by filtration and drying.

16. The process of claim 2 in which step c. includes recovering said polymers from the slurry and then dissolving said polymers in a chlorocarbon solvent and washing the resulting brominated polymer solution to remove occluded ionic halogen materials.

17. The process of claim 2 in which said polymers comprise from about 1 to about 40 percent by weight of the slurry.

18. The process of claim 17 in which said polymers comprise from about 10 to about 30 percent by weight of the slurry.

19. The process of claim 2 in which said sufficient temperature is between about 125° C. and about 150° C.

* * * * *